No. 869,985.　　　　　　　　　　　　　　　PATENTED NOV. 5, 1907.
E. RICHTER.
SELECTIVE SPEED DEVICE.
APPLICATION FILED JUNE 28, 1907.
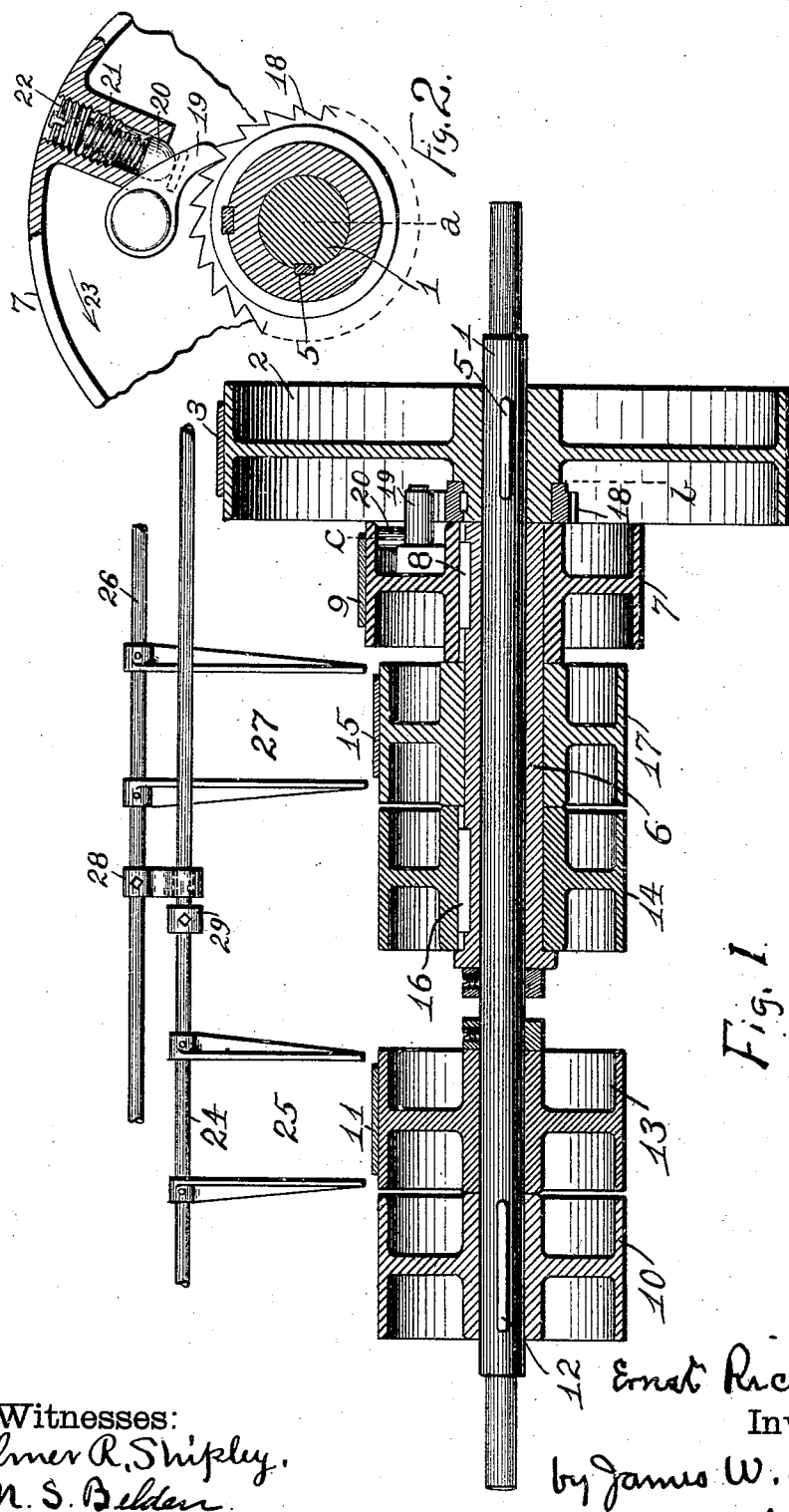
Witnesses:
Elmer R. Shipley.
M. S. Belden.
Ernst Richter
Inventor
by James W. See
Attorney

UNITED STATES PATENT OFFICE.

ERNST RICHTER, OF CINCINNATI, OHIO, ASSIGNOR TO THE G. A. GRAY COMPANY, OF CINCINNATI, OHIO.

SELECTIVE SPEED DEVICE.

No. 869,985.　　　　Specification of Letters Patent.　　　　Patented Nov. 5, 1907.

Application filed June 28, 1907. Serial No. 381,250.

*To all whom it may concern:*

Be it known that I, ERNST RICHTER, a citizen of the United States, residing at Cincinnati, Hamilton county, Ohio, have invented certain new and useful Improvements in Selective Speed Devices, of which the following is a specification.

In certain classes of machinery it is desirable to provide for a transmission of motion under some condition at constant speed and a transmission of motion under another ever present condition at selective speed. For illustration, in a metal planer the planer table may make its backing strokes at unvarying rate of speed, regardless of the kind of work being done, while the cutting strokes, which are most always at lower rate of speed than the backing strokes, should be selective as regards their rate of speed so as to be suited to various kinds of metal being planed. I have thought best to illustrate my present invention in a construction particularly adapted for metal planers.

In a metal planer arranged to be driven through the medium of my selective speed device I embody my invention in the countershaft and arrange to drive the countershaft by one belt to give one cutting speed to the planer and another belt to give an alternative cutting speed and a constant backing speed to the planer. A constant backing speed and two selective cutting speeds are thus provided for, though the system will lend itself to an unlimited number of selective cutting speeds, and the general invention is applicable to many situations where one regular speed is desired in connection with a series of selective speeds.

In the drawing, which exemplifies my invention as embodied in a countershaft of a metal planer, Figure 1 is a longitudinal section of the device in the plane of line *a* of Fig. 2 and Fig. 2 is a vertical transverse section in the planes of lines *b* and *c* of Fig. 1.

In the drawing:—1, indicates the countershaft: 2, a pulley fast thereon, to be employed in transmitting motion, by belt, to the planer at constant rate of speed for giving the backing stroke to the planer table, which pulley I will term the backing pulley: 3, the backing belt: 5, the key securing the backing pulley to the countershaft: 6, a sleeve loose on the countershaft: 7, a pulley fast on this sleeve for transmitting motion, by belt, to the planer for producing the cutting strokes of the planer, which pulley I will term the cutting pulley: 8, the key securing the cutting pulley to the sleeve; 9, the cutting belt: 10, a pulley fast on the countershaft, to serve in transmitting motion to the countershaft at constant rate, which pulley I will term the driving pulley: 11, the driving belt which, when on the driving pulley, serves to bring the motion to the countershaft, this belt, which I will term the main driving belt, being shown as off the driving pulley and on its mating loose pulley: 12, the key securing the driving pulley to the countershaft: and 13, the loose pulley mating with the driving pulley.

As thus far described, assuming cutting pulley 7 to turn with the countershaft, the device is precisely as is common in the countershafts of metal planers, the countershaft, when in motion, causing the cutting belt to be driven at one speed and the backing belt at another speed, these two speeds being dependent on the relative diameters of the cutting and backing pulleys. In the illustrated device the backing pulley 2, being fast on the countershaft, has the unvarying speed of that shaft. I provide for driving the cutting pulley 7 at the speed of the countershaft or, alternatively, for driving it at a higher rate of speed for quicker cutting.

Proceeding with the drawing:—14, indicates a pulley fast on the sleeve, which pulley I will term the secondary driving pulley: 15, the secondary driving belt to coöperate with this pulley and transmit motion to the sleeve at a higher rate of speed than that of the countershaft, this belt being shown as off the secondary driving pulley and on a mating loose pulley: 16, the key securing the secondary driving pulley to the sleeve: and 17, a loose pulley on the sleeve and mating with the secondary driving pulley.

It is manifest that if cutting pulley 7 be driven by the countershaft it will bring about a cutting speed for the planer due to the speed of the countershaft, while if it be driven by the secondary driving pulley 14, it will bring about a cutting speed for the planer at higher rate, due to the fact that belt 15 drives pulley 14 at higher than countershaft rate of speed.

Proceeding with the drawing:—18, indicates a ratchet fast on the countershaft, being illustrated as keyed to the hub of backing pulley 2 which is itself fast on the countershaft, the teeth of this ratchet facing in the direction of forward motion of all the rotary parts: 19, a pawl carried by the cutting pulley and coöperating with the ratchet: 20, a spring plunger carried by the cutting pulley and bearing on the pawl and urging the pawl into engagement with the ratchet: 21, the spring acting on the plunger: 22, a screw coöperating with the spring to serve in adjusting its tension: 23, an arrow indicating the direction of motion of all of the rotary parts: 24, shipper-rod for driving belt 11, this shipper-rod to be operated by hand in the usual manner: 25, shipper fingers on this rod to act on the driving belt: 26, shipper-rod for secondary driving belt: 27, shipper fingers on this rod for acting on the secondary driving belt: 28, a projection carried by the secondary shipper-rod: and 29, a collar carried by rod 24 in position to be engaged by projection 28 in such manner that when the secondary shipper is actuated, to throw secondary driving belt 15 onto the secondary driving pulley, the main shipper will be moved and throw main driving belt 11 onto the main driving pulley.

With the parts in the position shown in the drawing both driving belts are on loose pulleys and everything but these pulleys is at rest. If, by any means, driving belt 11 be thrown onto driving pulley 10 then the countershaft turns at constant countershaft speed, resulting in backing pulley 2 turning at countershaft speed, which speed is constant and is the backing speed. At the same time the ratchet, which is in engagement with the pawl, turns cutting pulley 7 at countershaft speed, and everything acts precisely as though the cutting pulley as well as the backing pulley was fast on the countershaft in the usual manner. If, however, while the backing pulley and cutting pulley are thus running at countershaft speed, the secondary driving belt be thrown to secondary driving pulley 14 then, through the medium of the sleeve, the cutting pulley will be given a speed greater than countershaft speed, the pawl and ratchet permitting the cutting pulley to run ahead of the backing pulley. It is thus seen that the backing pulley is driven at constant rate and that the cutting pulley may run at the same rate or, alternatively, at a greater rate in case a higher speed of cutting is desired for the planer.

When the cutting pulley is driven at superior rate by the secondary belt, the dragging of the pawl over the ratchet teeth would be seriously objectionable on account of the noise and the damage by wear. But, by adjusting the tension of spring 21, all dragging of the pawl can be avoided. The tension of the spring should, by means of screw 22, be so adjusted as to hold the pawl in engagement with the ratchet when the cutting pulley is turning at the speed of the ratchet, notwithstanding the effect of centrifugal force upon the pawl. But the tension of the spring is not so far to exceed this requirement as to overcome the centrifugal force of the pawl when the cutting pulley is turned at the high speed due to the secondary driving belt. It follows that when the secondary driving belt is thrown into action and the cutting pulley moves at its higher speed, the pawl flies outward free of the ratchet, avoiding all noise and wear, and when the secondary driving belt is thrown out of action and the cutting pulley slows down, the pawl will reëngage the ratchet and serve in transmitting motion to the cutting pulley at countershaft speed. For some purposes one pawl will be ample but for other purposes it may be desirable to provide the cutting pulley with a plurality of the pawls, all acting in the same way.

So far as the main belt shipper is concerned it acts as usual upon the main driving belt controlled by it. But, by reason of the projection 28 carried by the secondary belt shipper, when the secondary shipper is moved to throw the secondary belt onto the secondary driving pulley, the main driving belt is at the same time thrown to the main driving pulley, in other words, while the main driving belt can be thrown to and from the main driving pulley when the secondary driving belt is on its loose pulley, the secondary driving belt can not be thrown into action while the main driving belt is not in action. This is desirable for, while the cutting pulley can derive motion from either the main or secondary belt, the backing pulley is dependent for its motion entirely on the main driving belt.

While the ratchet is illustrated as being fast on the hub of the backing pulley, that backing pulley is fast on the countershaft, the result being precisely as though the ratchet were secured directly to the shaft. While in the illustrated example provision is made for giving one part a motion at constant speed and another part a motion at two selective speeds, it is manifest that the system can be extended to any extent desired so as to provide for one part being driven at constant speed and the other part being driven at quite a number of selective speeds.

I claim:—

1. A selective speed device comprising a first rotary part to turn at constant speed, a second rotary part concentric therewith to turn at selective speed, transmission mechanism for turning said first rotary part at its constant speed, transmission mechanism for turning said second rotary part at speed greater than that of the first rotary part, means for throwing said last-mentioned transmitting mechanism out of effective action, and pawl and ratchet mechanism connecting the first and second rotary parts and serving to transmit rotation from the former to the latter, combined substantially as set forth.

2. A selective speed device comprising a first rotary part to turn at constant speed, a second rotary part concentric therewith to turn at selective speed, transmission mechanism for turning said first rotary part at its constant speed, transmission mechanism for turning said second rotary part at speed greater than that of the first rotary part, means for throwing said last-mentioned transmitting mechanism out of effective action, a ratchet carried by the first rotary part, and a pawl carried by the second rotary part and serving to transmit rotation from the first to the second rotary part, combined substantially as set forth.

3. A selective speed device comprising a first rotary part to turn at constant speed, a second rotary part concentric therewith to turn at selective speed, transmission mechanism for turning said rotary part at its constant speed, transmission mechanism for turning said second rotary part at speed greater than that of the first rotary part, means for throwing said last-mentioned transmitting mechanism out of effective action, a ratchet carried by the first rotary part, a pawl carried by the second rotary part to serve in transmitting rotation from the first to the second rotary part, and an adjustable spring pressing the pawl into engagement with the ratchet and adapted to yield and permit the pawl to be free of the ratchet when the second rotary part is moving at its superior speed, combined substantially as set forth.

4. A selective speed device comprising a shaft, transmitting mechanism for driving the shaft at constant speed, a pulley fast on the shaft to transmit motion therefrom at constant speed, a pulley loose relative to the shaft for transmitting motion therefrom at selective speed, disconnectible transmitting mechanism for driving the latter pulley at speed greater than that of the shaft, and pawl and ratchet mechanism connecting the shaft and second pulley and serving to transmit rotation from the shaft to the second pulley when the disconnectible transmitting mechanism is out of effective action, combined substantially as set forth.

5. A selective speed device comprising a shaft, transmitting mechanism for turning the shaft at constant speed, a first pulley fast on the shaft for transmitting motion therefrom at constant speed, a sleeve loose on the shaft, a second pulley fast on the sleeve, disconnectible transmitting mechanism for turning the sleeve at a higher rate of speed than that of the shaft, and pawl and ratchet mechanism connecting the shaft and second pulley and serving to transmit rotation from the former to the latter when said disconnectible transmitting mechanism is out of effective action, combined substantially as set forth.

6. A selective speed device comprising a shaft, a first pulley fast thereon for transmitting motion therefrom at constant speed, a second pulley loose on the shaft for transmitting motion therefrom at selective speed, pawl and ratchet mechanism connecting the shaft and second pulley to serve in transmitting rotation from the formed to the latter at the lower speed for the second pulley, transmitting mechanism for giving motion to the shaft at constant speed, transmitting mechanism for giving motion to the second pulley at speed greater than that of the shaft, mechanism for throwing into and out of effective action at will the transmitting mechanism which drives the shaft at constant speed, mechanism for throwing into and out of effective action at will the transmitting mechanism which gives to the second pulley its high speed of motion, and connections between said two throwing mechanisms to cause the throwing into effective action of the transmitting mechanism for driving the second pulley at its high speed to bring about the throwing into action of the mechanism for transmitting motion to the shaft at its constant speed, combined substantially as set forth.

7. A selective speed device comprising a shaft, a pulley fast thereon for transmitting motion therefrom, a main driving pulley fast on the shaft for transmitting motion thereto, a loose pulley mating with the main driving pulley, a belt-shipper for controlling the main driving belt coöperating with the main driving pulley, a sleeve loose on the shaft, a second transmitting pulley fast on the sleeve for transmitting motion from the shaft at selective speeds, pawl and ratchet mechanism connecting the shaft and the second transmitting pulley, a secondary driving pulley fast on the sleeve, a loose pulley mating with the secondary driving pulley, a belt-shipper for controlling the secondary driving belt, and a connection between the two belt shippers to cause the throwing of the secondary belt to the secondary driving pulley to bring about the throwing of the main driving belt to the main driving pulley, combined substantially as set forth.

ERNST RICHTER.

Witnesses:
GEORGE W. NICHOLS,
GEO. M. CAVEN.